(12) United States Patent
Ohta et al.

(10) Patent No.: US 12,308,659 B2
(45) Date of Patent: May 20, 2025

(54) POWER TRANSMISSION DEVICE

(71) Applicant: OMRON Corporation, Kyoto (JP)

(72) Inventors: Takashi Ohta, Kyoto (JP); Yusuke Kawai, Kyoto (JP); Goro Nakao, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/180,866

(22) Filed: Mar. 9, 2023

(65) Prior Publication Data
US 2023/0336028 A1 Oct. 19, 2023

(30) Foreign Application Priority Data
Apr. 18, 2022 (JP) ................... 2022-068363

(51) Int. Cl.
| | | |
|---|---|---|
| *H02J 50/12* | (2016.01) | |
| *H02J 50/40* | (2016.01) | |
| *H02J 50/80* | (2016.01) | |
| *H02J 50/90* | (2016.01) | |

(52) U.S. Cl.
CPC ............ *H02J 50/12* (2016.02); *H02J 50/402* (2020.01); *H02J 50/80* (2016.02); *H02J 50/90* (2016.02)

(58) Field of Classification Search
CPC .. H02J 50/12; H02J 50/80; H02J 50/90; H02J 50/402
USPC ......................................................... 307/104
See application file for complete search history.

(56) References Cited

U.S. PATENT DOCUMENTS

| | | | | |
|---|---|---|---|---|
| 8,169,185 | B2 * | 5/2012 | Partovi ................. | H01F 27/366 320/108 |
| 10,498,163 | B2 * | 12/2019 | Lee ...................... | H02J 7/00304 |
| 10,601,249 | B2 * | 3/2020 | Park ..................... | H02J 7/00034 |
| 2012/0104999 | A1 * | 5/2012 | Teggatz ................. | H01F 38/14 336/200 |
| 2012/0161535 | A1 * | 6/2012 | Jung ...................... | H02J 50/70 307/104 |

(Continued)

FOREIGN PATENT DOCUMENTS

| | | |
|---|---|---|
| CN | 113162255 | 7/2021 |
| JP | 2010527226 | 8/2010 |

OTHER PUBLICATIONS

"Search Report of Europe Counterpart Application", issued on Sep. 19, 2023, p. 1-p. 6.

*Primary Examiner* — Alfonso Perez Borroto
(74) *Attorney, Agent, or Firm* — JCIPRNET

(57) ABSTRACT

A power transmission device includes power transmission coils, at least one power supply circuit, a communicator, and a control circuit. The power transmission coils transmit power to a power reception device via a power reception coil. The at least one power supply circuit supplies AC power to the power transmission coils, respectively. The communicator receives a signal indicating a power reception status of the power reception device from the power reception device. According to the power reception status, the control circuit selects a power transmission coil with a highest efficiency of power transmission to the power reception device among the power transmission coils to serve as the power transmission coil for power transmission to the power reception device, and controls the at least one power supply circuit so that AC power is supplied to the selected power transmission coil and is not supplied to an unselected power transmission coil.

3 Claims, 6 Drawing Sheets

(56) References Cited

U.S. PATENT DOCUMENTS

| | | | |
|---|---|---|---|
| 2013/0127254 A1 | 5/2013 | Miichi et al. | |
| 2013/0207480 A1* | 8/2013 | Sheng | H02J 50/10 |
| | | | 307/104 |
| 2013/0257365 A1* | 10/2013 | Redding | H02J 7/0071 |
| | | | 320/108 |
| 2014/0159653 A1* | 6/2014 | Von Novak | H04B 5/72 |
| | | | 320/108 |
| 2017/0264144 A1* | 9/2017 | Park | H02J 50/80 |
| 2018/0019624 A1* | 1/2018 | Chen | H02J 50/12 |
| 2018/0090968 A1* | 3/2018 | Pais | H01F 38/14 |
| 2018/0366260 A1* | 12/2018 | Yong | H01F 27/366 |
| 2019/0089196 A1* | 3/2019 | Chien | H04B 5/79 |
| 2019/0222052 A1* | 7/2019 | Ritter | H02J 7/00302 |
| 2021/0328463 A1* | 10/2021 | Park | H02J 7/00045 |
| 2022/0014234 A1* | 1/2022 | Choi | H04B 5/72 |
| 2022/0069631 A1* | 3/2022 | Choi | H02J 50/90 |
| 2022/0077893 A1* | 3/2022 | Lim | H02J 7/02 |

* cited by examiner

POWER TRANSMISSION DEVICE

CROSS-REFERENCE TO RELATED APPLICATION

This application claims the priority benefit of Japan application serial no. 2022-068363, filed on Apr. 18, 2022. The entirety of the above-mentioned patent application is hereby incorporated by reference herein and made a part of this specification.

BACKGROUND

Technical Field

The disclosure relates to a power transmission device for transmitting power to a power reception device in a non-contact manner.

Related Art

Conventionally, so-called non-contact power supply (also called wireless power supply) techniques for transmitting power through a space without passing through metal contacts or the like have been studied.

As one of such non-contact power supply techniques, it has been proposed to transmit power from a power transmission side device (hereinafter simply referred to as a power transmission device) to a power reception side device (hereinafter simply referred to as a power reception device) via a power transmission side coil and a power reception side coil. In particular, it has been proposed that, by providing a power transmission device with a plurality of coils for power transmission, the degree of freedom in the position of the power reception device when power transmission is performed can be increased (e.g., see Patent Document 1: Japanese Patent Application Laid-Open No. 2010-527226).

In the case where the power transmission device is provided with a plurality of coils, the efficiency of power transmission changes depending on the relative positional relationship of the power reception device with respect to the plurality of coils, and the coil actually used to supply power to the power reception device.

SUMMARY

An aspect of the disclosure provides a power transmission device capable of transmitting power to a power reception device including a power reception coil in a non-contact manner. The power transmission device includes a plurality of power transmission coils, at least one power supply circuit, a communicator, and a control circuit. The plurality of power transmission coils transmit power to the power reception device via the power reception coil. The at least one power supply circuit supplies AC power to the plurality of power transmission coils, respectively. The communicator receives a signal indicating a power reception status of the power reception device from the power reception device. The control circuit selects, according to the power reception status, a power transmission coil with a highest efficiency of power transmission to the power reception device from among the plurality of power transmission coils to serve as the power transmission coil to be used for power transmission to the power reception device, and controls the at least one power supply circuit so that AC power is supplied to the selected power transmission coil among the plurality of power transmission coils and AC power is not supplied to an unselected power transmission coil among the plurality of power transmission coils.

With such a configuration, since the power transmission device transmits power using the power transmission coil with a high power transmission efficiency and does not supply power to the other power transmission coils, unnecessary power consumption can be suppressed. As a result, the power transmission device can improve the power transmission efficiency.

In the power transmission device, the signal indicating the power reception status may include a value indicating a voltage outputted from the power reception device. While the signal indicating the power reception status is not received from the power reception device, the control circuit of the power transmission device may supply AC power to each of the plurality of power transmission coils from a corresponding power supply circuit among the at least one power supply circuit at a predetermined cycle and at mutually different timings. In the plurality of power transmission coils, from among a power transmission coil that is supplied with AC power when the signal indicating the power reception status is received from the power reception device and at least one power transmission coil positioned around this power transmission coil, the control circuit of the power transmission device may select a power transmission coil with a highest voltage outputted from the power reception device to serve as the power transmission coil to be used for power transmission to the power reception device.

With such a configuration, the power transmission device can appropriately select a power transmission coil with a high efficiency of power transmission to the power reception device.

In the power transmission device, the plurality of power transmission coils may be provided on a substrate, and the substrate may be supported by a support member capable of adjusting a position of the substrate. The control circuit of the power transmission device may control, according to the power reception status of the power reception device, the support member to adjust the position of the substrate so that a power transmission efficiency in a case of transmitting power from the selected power transmission coil to the power reception device increases.

With such a configuration, since the power transmission device can optimize the position of the power transmission coil used for power transmission with respect to the power reception device, the power transmission efficiency can be further improved.

DESCRIPTION OF THE EMBODIMENTS

Embodiments of the disclosure provide a power transmission device capable of improving power transmission efficiency by using a plurality of coils for power transmission.

Hereinafter, a power transmission device according to an embodiment of the disclosure will be described with reference to the drawings. The power transmission device includes a plurality of coils (hereinafter referred to as power transmission coils) used to transmit power to a power reception device in a non-contact manner. When the power reception device is arranged at a position capable of receiving power from the power transmission device, the power transmission device transmits power to the power reception device via any of the plurality of power transmission coils. To select the power transmission coil to be used for power transmission from among the plurality of power transmission coils, the power transmission device receives a signal indicating a power reception status from the power reception device, and selects the power transmission coil with a highest power transmission efficiency according to the power reception status.

Figure 1:
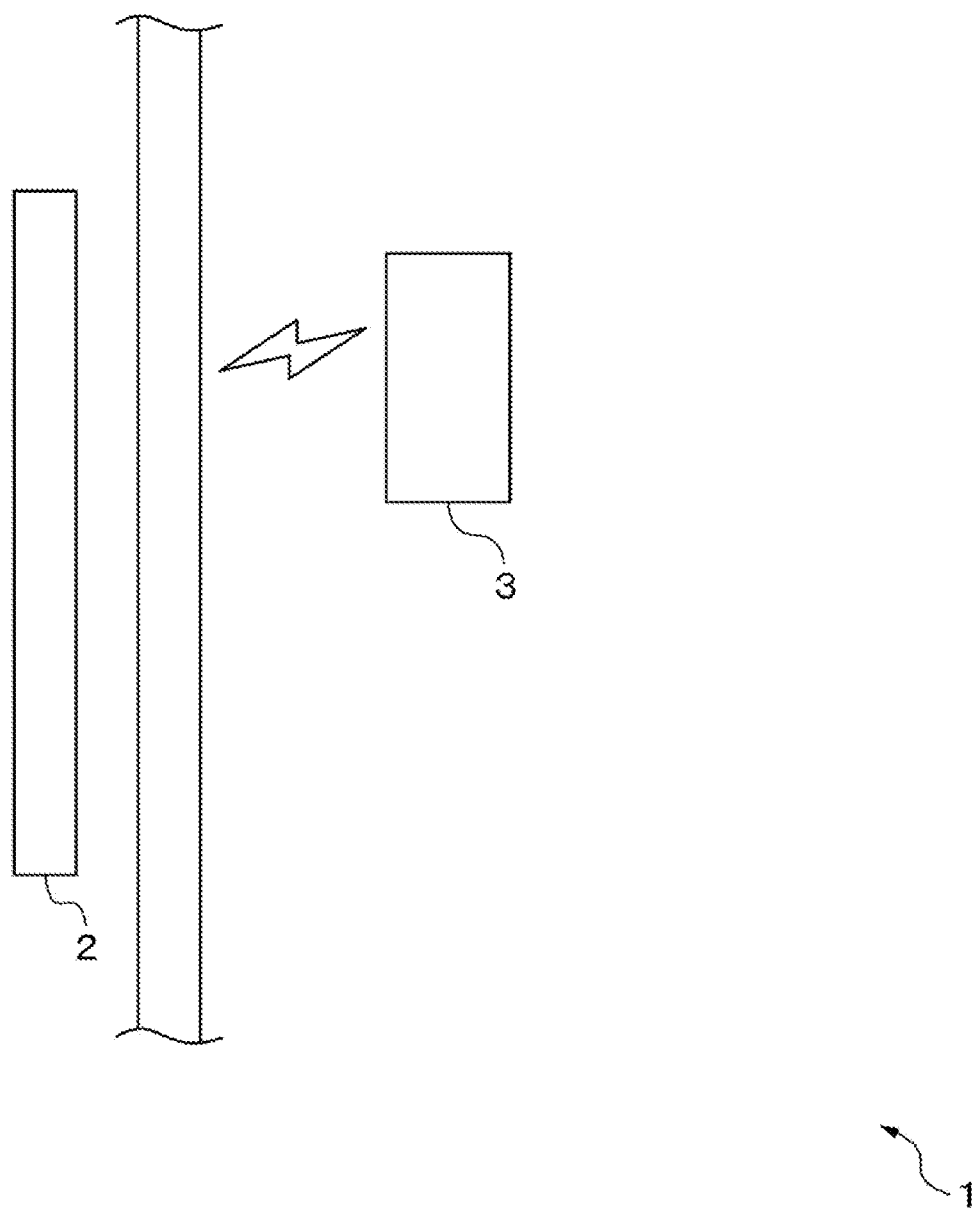
FIG. 1 is a schematic configuration view of a non-contact power supply system including a power transmission device according to this embodiment.

FIG. 1 is a schematic configuration view of a non-contact power supply system including the power transmission device according to this embodiment.

As shown in FIG. 1, a non-contact power supply system 1 includes a power transmission device 2 and a power reception device 3 to which power is transmitted from the power transmission device 2 through a space in a non-contact manner. The power transmission device 2 is arranged, for example, in a predetermined building. More specifically, the power transmission device 2 is installed on the back side of a wall, on the back side of a ceiling, or on the lower side of a floor of any room in the predetermined building, or installed on the back side of any outer wall of the predetermined building. The power transmission device 2 transmits power supplied from a commercial power supply or a power supply device provided in the predetermined building, to the power reception device 3 positioned within a range capable of power transmission inside or outside the building, in a non-contact manner across a wall surface or the like. The power reception device 3 is mounted on a portable apparatus such as a so-called smartphone or another mobile apparatus, and receives the power transmitted from the power transmission device 2. The power received by the power reception device 3 is used for charging a battery provided in the apparatus mounted with the power reception device 3, or used for operating the apparatus mounted with the power reception device 3.

In this embodiment, the power transmission device 2 and the power reception device 3 are configured as a non-contact power supply system of a type (NS type) that does not utilize resonance on the power transmission side, but generates series resonance between a coil and a resonant capacitor of a resonant circuit of the power reception device 3 on the power reception side. However, the embodiment is not limited to this example, and the power transmission device 2 and the power reception device 3 may also be, for example, a non-contact power supply system of a so-called primary-series-secondary-series resonant capacitor type (SS type) or a primary-series-secondary-parallel resonant capacitor type (SP type). Alternatively, the power transmission device 2 and the power reception device 3 may also be a non-contact power supply system according to another non-contact power supply method such as a type (NP type) that does not utilize resonance on the power supply side, but generates parallel resonance between a coil and a resonant capacitor of a resonant circuit of the power reception device 3 on the power reception side.

Figure 2:
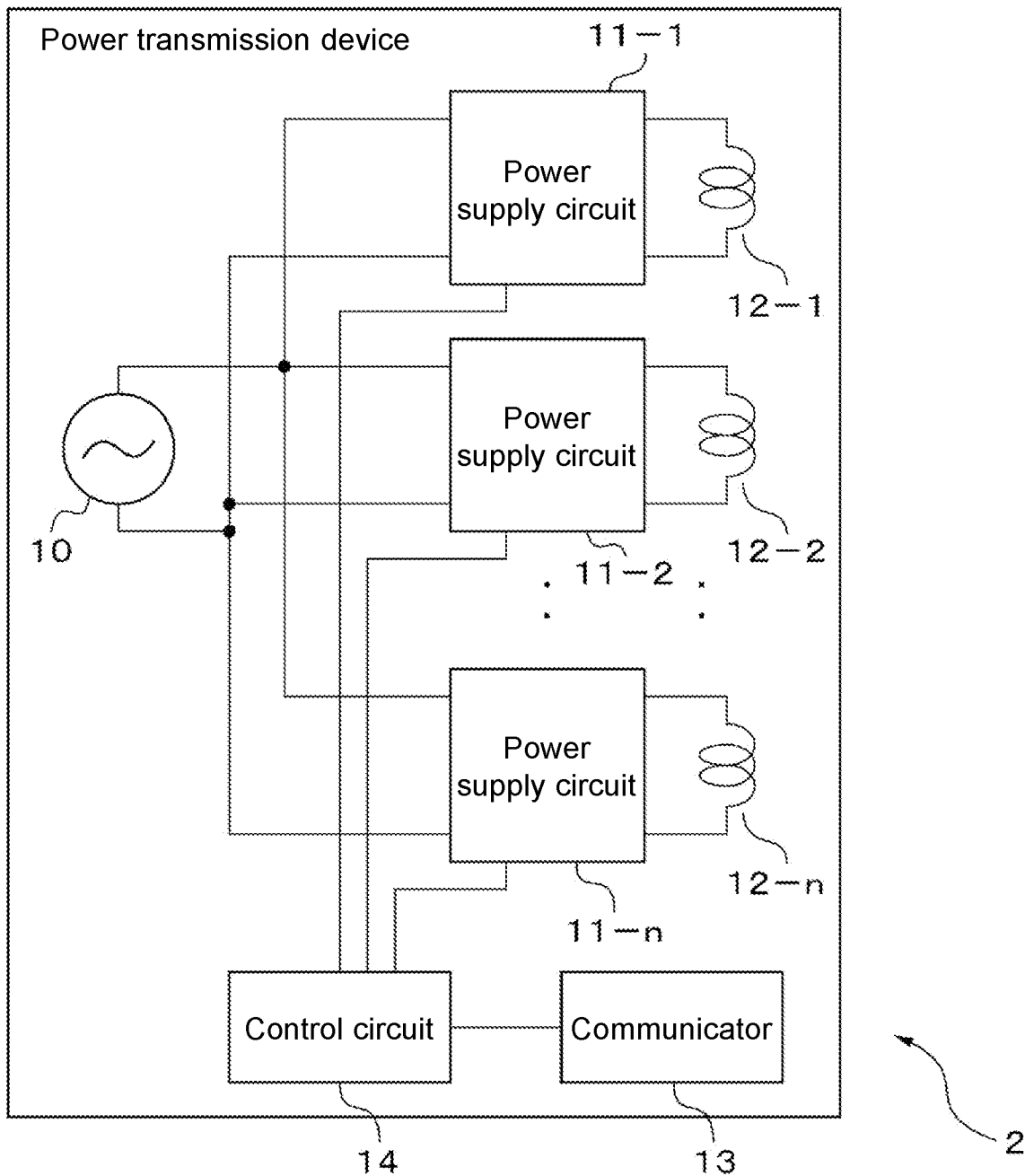
FIG. 2 is a schematic configuration view of the power transmission device.

FIG. 2 is a schematic configuration view of the power transmission device 2. The power transmission device 2 includes n (where n is an integer equal to or greater than 2) power supply circuits 11-1 to 11-$n$, n power transmission coils 12-1 to 12-$n$, a communicator 13, and a control circuit 14. These circuits included in the power transmission device 2 are arranged on one or more substrates.

The power supply circuits 11-1 to 11-$n$ supply AC power having a predetermined drive frequency and a predetermined voltage to corresponding power transmission coils among the power transmission coils 12-1 to 12-$n$. The power supply circuits 11-1 to 11-$n$ may change at least one of the voltage and the drive frequency of the AC power supplied to the corresponding power transmission coils. Since the power supply circuits 11-1 to 11-$n$ may have the same configuration and the same function, one power supply circuit 11-$j$ ($j=1, \ldots, n$) will be described below.

The power supply circuit 11-$j$ includes, for example, a full-wave rectifier circuit, a power factor correction circuit, and an inverter.

The full-wave rectifier circuit includes, for example, four bridge-connected diodes and is connected to a commercial power supply 10. The full-wave rectifier circuit rectifies AC power supplied from the commercial power supply 10 to convert into a power having a pulsating voltage, and outputs the power to the power factor correction circuit.

The power factor correction circuit converts the voltage of the power outputted from the full-wave rectifier circuit into a DC power having a voltage corresponding to the control from the control circuit 14 to output to the inverter. The configuration of the power factor correction circuit may be a configuration similar to any of various power factor correction circuits capable of adjusting an amplification factor of an outputted voltage with respect to an inputted voltage under control from the control circuit 14.

In the case of being connected to a power supply device that supplies DC power, the power supply circuit 11-$j$ may include a DC-DC converter instead of the power factor correction circuit. Furthermore, the DC-DC converter may be a variable DC-DC converter capable of changing an outputted voltage according to the control from the control circuit 14.

The inverter is configured as a full-bridge circuit in which four switching elements are connected in a full-bridge configuration, and the inverter converts the DC power outputted from the power factor correction circuit into an AC power having a drive frequency equivalent to an ON/OFF switching cycle of the switching elements. Then, the inverter outputs the AC power to a power transmission coil 12-$j$.

Each switching element may be, for example, an n-channel MOSFET. ON/OFF of each switching element is controlled by the control circuit 14. Therefore, with the control circuit 14 adjusting the ON/OFF cycle of each switching element, the drive frequency of the AC power supplied to the power transmission coil 12-$j$ is controlled.

The inverter is not limited to the embodiment described above. For example, the inverter may be configured as a half-bridge circuit in which two switching elements are connected in a half-bridge configuration.

The power transmission coils 12-1 to 12-$n$ are each connected to the corresponding power supply circuit among the power supply circuits 11-1 to 11-$n$ and transmit power to the power reception device 3 by generating a magnetic field corresponding to the AC power supplied from the corresponding power supply circuit. A DC blocking capacitor may be provided between each power transmission coil and the corresponding power supply circuit. Further, in the case where the non-contact power supply system 1 utilizes resonance on the power transmission side, a capacitor forming a resonant circuit together with the power transmission coil may be provided for each of the power transmission coils 12-1 to 12-n.

Figure 3:
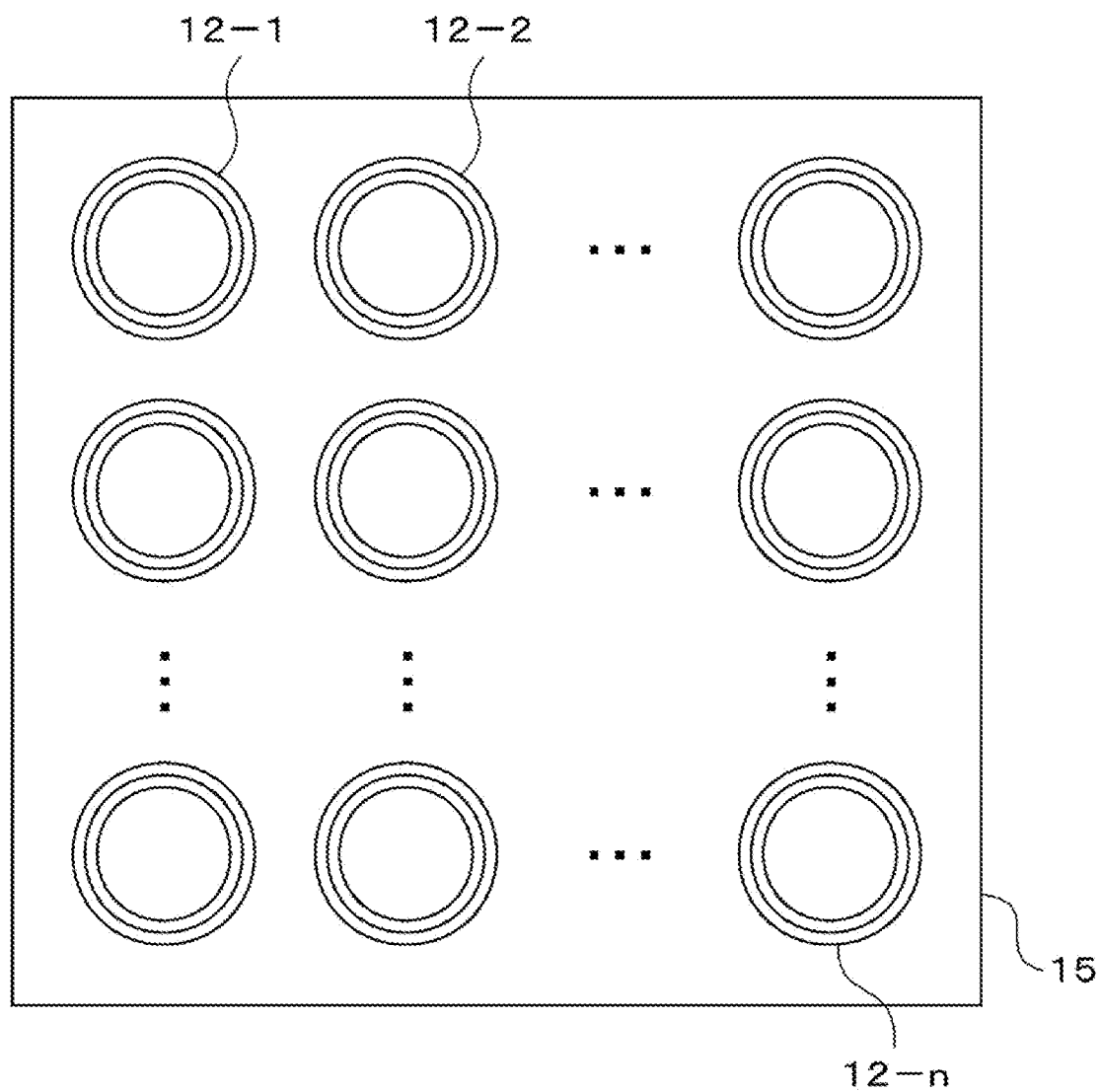
FIG. 3 is a view showing an example of an arrangement of power transmission coils.

FIG. 3 is a view showing an example of an arrangement of the power transmission coils 12-1 to 12-n. As shown in FIG. 3, each of the power transmission coils 12-1 to 12-n has the same size and is formed to have a circular outer shape. Furthermore, the power transmission coils 12-1 to 12-n are arranged in a grid pattern on a substrate 15 so that a winding axis thereof is aligned with a normal direction of the substrate 15. In this example, each of the power transmission coils 12-1 to 12-n is formed by wiring on the substrate 15, but the embodiment is not limited to this example, and each of the power transmission coils 12-1 to 12-n may also be formed by winding a conductive wire around a core provided on the substrate 15 for each power transmission coil. The shape of the power transmission coils 12-1 to 12-n is not limited to a circular shape, but may also be an elliptical, hexagonal, or rectangular shape. Moreover, all of the power transmission coils 12-1 to 12-n do not necessarily have the same shape, but some of the power transmission coils 12-1 to 12-n may have shapes different from other power transmission coils. Furthermore, all of the power transmission coils 12-1 to 12-n do not necessarily have the same size, but some of the power transmission coils 12-1 to 12-n may have sizes different from other power transmission coils. Furthermore, the power transmission coils 12-1 to 12-n may be arranged according to an arrangement other than the grid pattern. For example, the power transmission coils 12-1 to 12-n may be arranged in a zigzag pattern so that adjacent rows are staggered. Alternatively, the power transmission coils 12-1 to 12-n may be arranged in a row along a predetermined straight line or curve.

Figure 4:
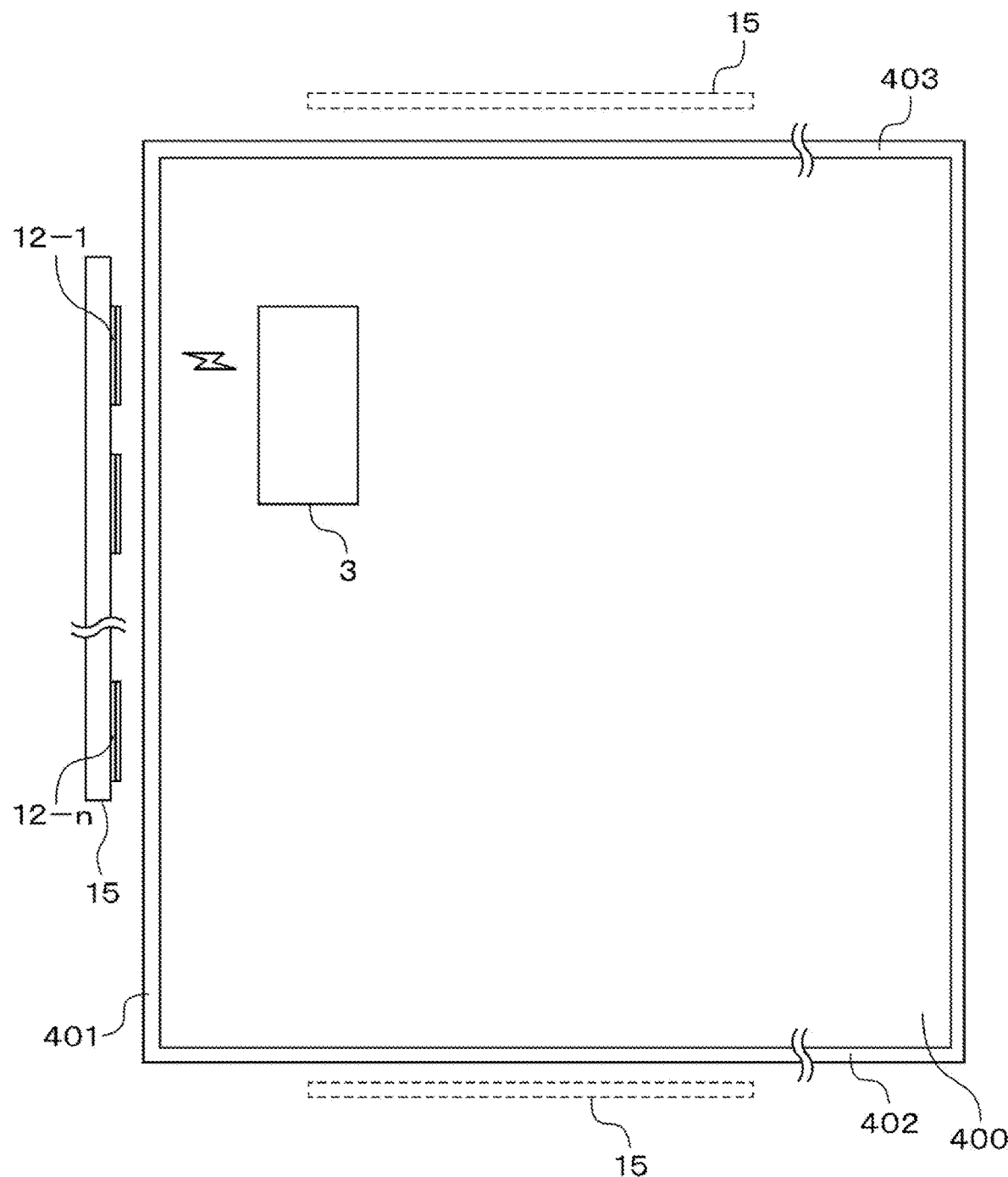
FIG. 4 is a view showing an example of an arrangement of a substrate provided with the power transmission coils.

FIG. 4 is a view showing an example of an arrangement of the substrate 15 provided with the power transmission coils. In this example, the substrate 15 is arranged along a wall 401 on the back side of the wall 401 of a room 400 where the power reception device 3 to receive power is positioned. Further, each of the power transmission coils 12-1 to 12-n is provided on a surface of the substrate 15 facing the wall 401. That is, the substrate 15 is arranged so that the winding axes of the power transmission coils 12-1 to 12-n are substantially aligned with a normal direction of the wall 401. Therefore, by arranging the power reception device 3 so that a power reception coil included in the power reception device 3 and any of the power transmission coils 12-1 to 12-n are opposed to each other across the wall 401, power can be transmitted from the power transmission device 2 to the power reception device 3. The substrate 15 may be attached to the back surface of the wall 401 using a fixing member such as screws, or may be arranged near the back surface of the wall 401 by a support member (not shown) arranged near the wall 401.

Further, the substrate 15 may also be arranged along the lower surface of a floor 402 of the room 400 so that the lower surface of the floor 402 faces each of the power transmission coils 12-1 to 12-n. Alternatively, the substrate 15 may also be arranged along the back surface of a ceiling 403 of the room 400 so that the back surface of the ceiling 403 faces each of the power transmission coils 12-1 to 12-n.

Each time the communicator 13 receives a wireless signal from a communicator of the power reception device 3, the communicator 13 extracts a signal indicating a power reception status of the power reception device 3 from the wireless signal and outputs the signal to the control circuit 14. Therefore, the communicator 13 includes, for example, an antenna for receiving a wireless signal according to a predetermined wireless communication standard, and a communication circuit for demodulating the wireless signal. The predetermined wireless communication standard may be, for example, ISO/IEC 15693, ZigBee (registered trademark), or Bluetooth (registered trademark).

The control circuit 14 includes, for example, a nonvolatile memory circuit, a volatile memory circuit, an arithmetic circuit, and an interface circuit for connecting with other circuits. The control circuit 14 controls the power supply circuits 11-1 to 11-n based on the signal indicating the power reception status of the power reception device 3 received from the power reception device 3 via the communicator 13. Details of the control on the power supply circuits 11-1 to 11-n by the control circuit 14 will be described later.

Next, details of the power reception device 3 will be described.

Figure 5:
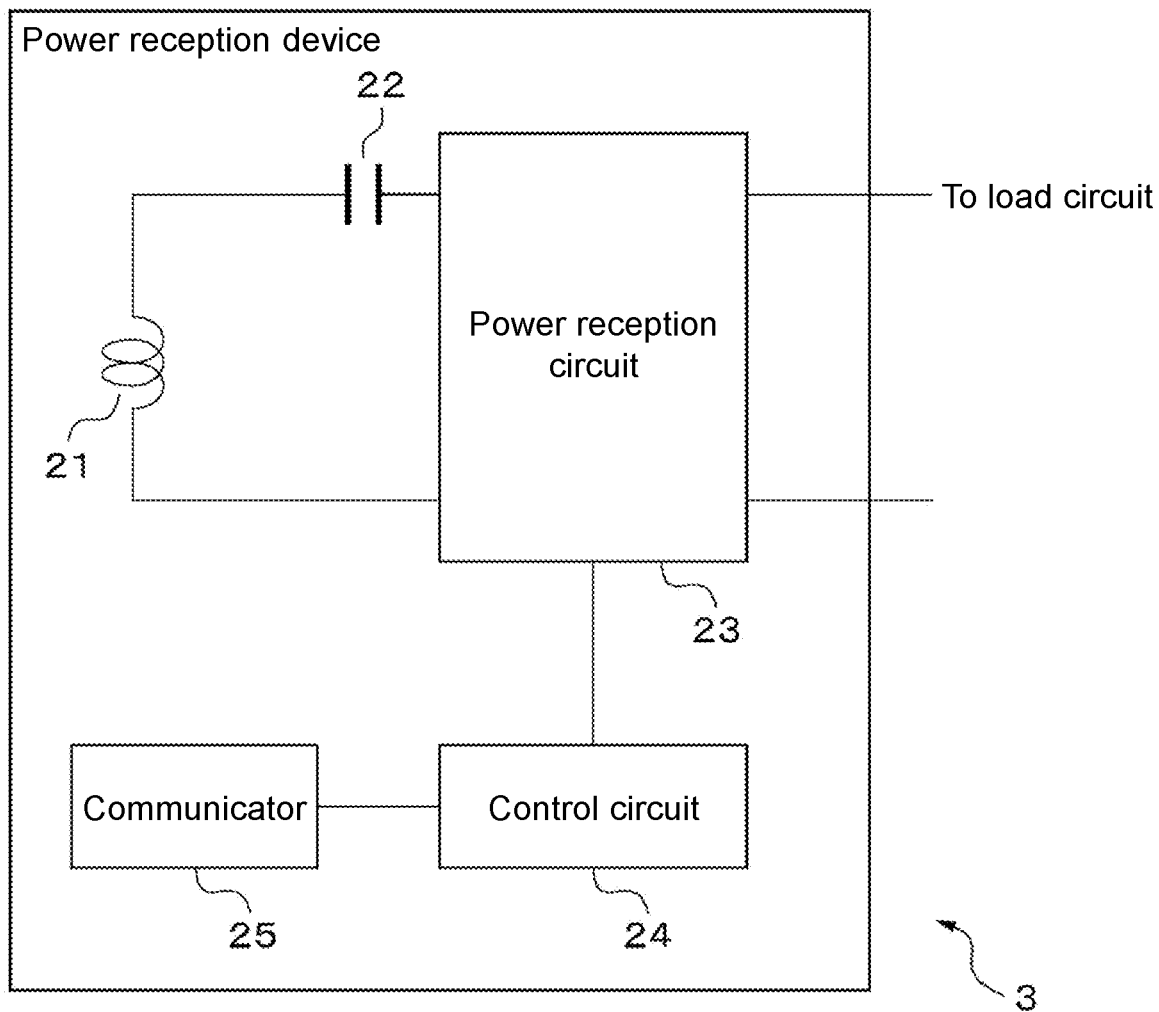
FIG. 5 is a schematic configuration view of a power reception device.

FIG. 5 is a schematic configuration view of the power reception device 3. The power reception device 3 includes a power reception coil 21, a resonant capacitor 22, a power reception circuit 23, a control circuit 24, and a communicator 25.

The power reception coil 21 forms a resonant circuit together with the resonant capacitor 22, and receives power from the power transmission coils 12-1 to 12-n by resonating with alternating currents flowing through the power transmission coils 12-1 to 12-n of the power transmission device 2. Therefore, the resonant capacitor 22 is connected in series with the power reception coil 21. In another example, the resonant capacitor 22 may also be connected in parallel with the power reception coil 21. AC power outputted from the resonant circuit formed by the power reception coil 21 and the resonant capacitor 22 is outputted to the power reception circuit 23. The number of turns of the power reception coil 21 may be the same as or may be different from the number of turns of each of the power transmission coils 12-1 to 12-n of the power transmission device 2. Further, the shape and size of the power reception coil 21 may be the same as or may be different from the shape and size of each of the power transmission coils 12-1 to 12-n of the power transmission device 2.

The power reception circuit 23 converts the AC power received from the resonant circuit formed by the power reception coil 21 and the resonant capacitor 22 into a DC power, and outputs the DC power to a load circuit (not shown) connected to the power reception circuit 23. The load circuit is, for example, a circuit provided in an apparatus built with the power reception device 3, such as a charger for charging a battery of the apparatus built with the power reception device 3. Further, the power reception circuit 23 detects a status of power reception from the power transmission device 2, particularly an output voltage from the power reception circuit 23. Therefore, the power reception circuit 23 includes a rectifying and smoothing circuit and a voltage detection circuit.

The rectifying and smoothing circuit includes a full-wave rectifier circuit having four bridge-connected switching elements such as diodes or MOSFETs and a smoothing capacitor, and rectifies and smooths the power received via the power reception coil 21 to convert into a DC power. Then, the rectifying and smoothing circuit outputs the DC power to the load circuit.

The voltage detection circuit measures an output voltage between two terminals on the output side of the rectifying and smoothing circuit (i.e., output voltage of the power reception circuit 23, hereinafter simply referred to as an output voltage) at a predetermined cycle. Since the output voltage between the two terminals of the rectifying and smoothing circuit is in a one-to-one correspondence with the output voltage of the resonant circuit composed of the power reception coil 21 and the resonant capacitor 22, the measured value of the output voltage between the two terminals of the rectifying and smoothing circuit is indirectly taken as the measured value of the output voltage of the resonant circuit. The voltage detection circuit may be, for example, any of various known voltage detection circuits capable of detecting DC voltages. Then, the voltage detection circuit outputs the measured value of the output voltage to the control circuit 24.

The control circuit 24 includes, for example, a nonvolatile memory circuit, a volatile memory circuit, an arithmetic circuit, and an interface circuit for connecting with other circuits. The control circuit 24 compares the measured value of the output voltage from the power reception circuit 23 with a predetermined threshold at a predetermined cycle. If the measured value of the output voltage exceeds the predetermined threshold, the control circuit 24 determines that power transmitted from the power transmission device 2 has been detected. Then, the control circuit 24 generates a signal indicating a power reception status and outputs the signal to the communicator 25. The control circuit 24 incorporates, into the signal indicating the power reception status, a value indicating the output voltage from the power reception device 3, e.g., a latest measured value of the output voltage. Furthermore, the control circuit 24 may also incorporate, into the signal indicating the power reception status, information indicating a predetermined allowable range to be satisfied by the output voltage, together with the latest measured value of the output voltage. Alternatively, the control circuit 24 may also incorporate, into the signal indicating the power reception status, a signal value indicating whether the latest measured value of the output voltage is included in the predetermined allowable range, is below the allowable range, or is above the allowable range. Moreover, the control circuit 24 may incorporate, into the signal indicating the power reception status, a signal value indicating that power transmission is not required, such as a signal indicating charging completion, received from the load circuit (not shown). Alternatively, the control circuit 24 may also incorporate, into the signal indicating the power reception status, a signal value indicating that resumption of power transmission is required, such as a signal indicating charging resumption, received from the load circuit (not shown).

Upon receiving the signal indicating the power reception status from the control circuit 24, the communicator 25 generates a wireless signal including the signal indicating the power reception status, and transmits the wireless signal to the communicator 13 of the power transmission device 2. Therefore, the communicator 25 includes, for example, a communication circuit for generating a wireless signal according to a predetermined wireless communication standard, and an antenna for outputting the wireless signal. Similar to the communicator 13, the predetermined wireless communication standard may be, for example, ISO/IEC 15693, ZigBee (registered trademark), or Bluetooth (registered trademark).

Details of the operation of the control circuit 14 of the power transmission device 2 will be described below.

The control circuit 14 operates the power supply circuits 11-1 to 11-*n* in a standby mode while the communicator 13 does not receive a wireless signal from the power reception device 3.

In the standby mode, the control circuit 14 sets an operating period of being active at a predetermined cycle and at mutually different timings for each of the power supply circuits 11-1 to 11-*n*. That is, the control circuit 14 supplies AC power to the corresponding power transmission coil only from the power supply circuit that is in the operating period among the power supply circuits 11-1 to 11-*n*. That is, during the operating period, the control circuit 14 switches ON/OFF of each switching element of the inverter of the power supply circuit that is in the operating period at a switching cycle corresponding to a predetermined drive frequency. Furthermore, the control circuit 14 controls the power factor correction circuit or the DC-DC converter of the power supply circuit that is in the operating period to set the voltage of the AC power supplied to the corresponding power transmission coil to a predetermined standby voltage. The standby voltage, for example, is set to a relatively low voltage that enables the power reception device 3 to detect power received from the power transmission coil when the power reception device 3 is positioned within the range capable of receiving power from any of the power transmission coils. Also, the control circuit 14 turns off each switching element of the inverter of the power supply circuit during an idle period other than the operating period to stop power supply from the power supply circuit to the corresponding power transmission coil.

The sequence for the power supply circuits to be active is as follows, for example. That is, in the case where the power transmission coils 12-1 to 12-*n* are arranged two-dimensionally, the sequence for the power supply circuits to be active is set so that AC power is supplied to the power transmission coils 12-1 to 12-*n* in a raster scan order. For example, in the example shown in FIG. 3, first, the power supply circuit 11-1 which supplies AC power to the power transmission coil 12-1 positioned at the upper left end is set to be active. Next, the power supply circuit 11-2 which supplies AC power to the power transmission coil 12-2 positioned to the right of the power transmission coil 12-1 is set to be active. Then, when the power supply circuit that supplies AC power to the power transmission coil at the right end of the top row is set to be active, next, the power supply circuit that supplies AC power to the power transmission coil positioned at the left end in the second row from the top is set to be active. The power supply circuits are set to be active in turn, one by one according to such a sequence, and eventually, the power supply circuit 11-*n* which supplies AC power to the power transmission coil 12-*n* positioned at the lower right end is set to be active. Then, again, the power supply circuits are set to be active sequentially starting from the power supply circuit 11-1.

The sequence for the power supply circuits to be active is not limited to the sequence described above. For example, the power supply circuits corresponding to the power transmission coils positioned in odd columns or odd rows in the array of the power transmission coils may first be sequentially set to be active, and afterwards, the power supply circuits corresponding to the power transmission coils positioned in even columns or even rows may then be sequentially set to be active. Further, the power supply circuits corresponding to the power transmission coils may be set to be active sequentially from the top end to the bottom end in any vertical column, and when the power supply circuit corresponding to the power transmission coil at the bottom end is set to be active, the power supply circuits corresponding to the power transmission coils may be sequentially set to be active similarly for the adjacent vertical column. Furthermore, in the case where the power transmission coils 12-1 to 12-$n$ are arranged in a column along a predetermined straight line or curve, the power supply circuits may be set to be active one by one in a sequence from the power supply circuit corresponding to the power transmission coil positioned at either end to the power supply circuit corresponding to the power transmission coil positioned at the other end.

When the communicator 13 receives a wireless signal from the communicator 25 of the power reception device 3, the control circuit 14 assumes that the power reception device 3 is positioned within the range capable of receiving power from any of the power transmission coils. Therefore, the control circuit 14 operates the power supply circuits 11-1 to 11-$n$ in a search mode. In the search mode, the control circuit 14 controls each power supply circuit to determine the power transmission coil to be used to supply power to the power reception device 3 among the power transmission coils 12-1 to 12-$n$.

Therefore, the control circuit 14 specifies the power supply circuit that is active when the communicator 13 receives the wireless signal to serve as the power supply circuit taken as a search reference point. This is because it is estimated that the power reception device 3 receives power from the power transmission coil supplied with the AC power from the power supply circuit that is active when the communicator 13 receives the wireless signal. Then, the control circuit 14 selects a power transmission coil to be used for power transmission from among the power transmission coil supplied with the AC power from the power supply circuit taken as the search reference point, and at least one power transmission coil positioned around it. Specifically, centering around the power transmission coil supplied with the AC power from the power supply circuit taken as the search reference point, the control circuit 14 sequentially activates one by one the power supply circuits corresponding to the power transmission coils positioned around this power transmission coil. For example, the corresponding power supply circuits are set to be active in a clockwise or counterclockwise sequence for the power transmission coils positioned around the power transmission coil that is supplied with the AC power from the power supply circuit taken as the search reference point. At this time, referring to arrangement information indicating the arrangement of the power transmission coils 12-1 to 12-$n$ and the power supply circuits which supply AC power to the power transmission coils, the control circuit 14 specifies the power transmission coil that is supplied with the AC power from the specified power supply circuit and the power transmission coils positioned around it. The arrangement information may be stored in a memory included in the control circuit 14.

The control circuit 14 monitors the measured value of the output voltage from the power reception device 3 included in the received signal indicating the power reception status. Then, the control circuit 14 specifies the power supply circuit that is active when the measured value is the highest and the power transmission coil (hereinafter sometimes referred to as a corresponding power transmission coil) that is supplied with the AC power from this power supply circuit to serve as the power supply circuit and the power transmission coil to be taken as the next search reference point. By repeating the above process, the control circuit 14 specifies the power supply circuit that is active when the measured value of the output voltage from the power reception device 3 is the highest and the corresponding power transmission coil. It is estimated that by using the power transmission coil with the maximum measured value of the output voltage for power transmission, the power transmission efficiency would become the highest. Therefore, the control circuit 14 selects the specified power supply circuit and the corresponding power transmission coil as the power supply circuit and the power transmission coil to be used for power transmission to the power reception device 3. By selecting the power supply circuit and the power transmission coil to be used for power transmission to the power reception device 3 in this manner, the control circuit 14 can appropriately select the power transmission coil with high power transmission efficiency. The control circuit 14 is not limited to the above example, and may also specify the power transmission coil with the maximum measured value of the output voltage according to another method. For example, after first receiving a signal indicating the power reception status, the control circuit 14 supplies AC power to all the power transmission coils sequentially starting from the corresponding power supply circuit. Then, by recording the measured value of the output voltage included in the received signal indicating the power reception status for each power transmission coil supplied with the AC power, the control circuit 14 may specify the power transmission coil that is supplied with the AC power when the measured value of the output voltage is the highest.

When the power supply circuit and the power transmission coil to be used for power transmission to the power reception device 3 are selected, the control circuit 14 operates the selected power supply circuit in a power transmission mode and sets the other power supply circuits to an idle mode. For the power supply circuit in the power transmission mode, while receiving the wireless signal from the power reception device 3, or until the signal indicating the power reception status included in the wireless signal received from the power reception device 3 indicates that power transmission is not required, the control circuit 14 switches ON/OFF of each switching element of the inverter of the power supply circuit in the power transmission mode at a switching cycle corresponding to the drive frequency. Furthermore, the control circuit 14 controls the power factor correction circuit or the DC-DC converter of the power supply circuit in the power transmission mode to adjust the voltage of the AC power supplied from the power supply circuit to the corresponding power transmission coil so that the measured value of the output voltage is within the predetermined allowable range. That is, if the measured value of the output voltage is lower than the predetermined allowable range, the control circuit 14 controls the power factor correction circuit or the DC-DC converter so that the voltage of the AC power supplied to the power transmission coil is increased. Conversely, if the measured value of the output voltage is higher than the predetermined allowable range, the control circuit 14 controls the power factor correction circuit or the DC-DC converter so that the voltage of the AC power supplied to the power transmission coil is lowered.

Furthermore, depending on the positional relationship between the power transmission coil used for power transmission and the power reception coil 21 of the power reception device 3, the degree of coupling between the power transmission coil and the power reception coil 21 changes. The drive frequency at which the power transmission efficiency increases also changes depending on the degree of coupling. Therefore, by changing the ON/OFF switching cycle of each switching element of the inverter of the selected power supply circuit, the control circuit 14 may change the drive frequency of the AC power supplied from the power supply circuit to the corresponding power transmission coil. The control circuit 14 may control the drive frequency so that the measured value of the output voltage included in the received signal indicating the power reception status is the highest.

Further, the control circuit 14 turns off each switching element of the inverter of the power supply circuit in the idle mode so that AC power is not supplied from the power supply circuit to the power transmission coil. By setting the power supply circuit that is not used for power transmission to the idle mode in this manner, the control circuit 14 can suppress wasteful power consumption that is not used for power transmission.

Even if the control circuit 14 controls the voltage of the AC power supplied from the power supply circuit in the power transmission mode, the measured value of the output voltage from the power reception device 3 included in the wireless signal received from the power reception device 3 may sometimes still not reach the predetermined allowable range. In such a case, the control circuit 14 may also operate, in the power transmission mode, a power supply circuit that supplies AC power to a power transmission coil adjacent to the power transmission coil corresponding to the power supply circuit in the power transmission mode. At this time, the control circuit 14 may increase the quantity of the power supply circuits operated in the power transmission mode until the measured value of the output voltage from the power reception device 3 is within the predetermined allowable range. Accordingly, since power is supplied from a plurality of power transmission coils to the power reception device 3, it becomes easy for the output voltage from the power reception device 3 to be included the predetermined allowable range.

Further, after the measured value of the output voltage from the power reception device 3 is included in the predetermined allowable range, if the measured value drops below the predetermined allowable range, the control circuit 14 assumes that the power reception device 3 has moved. Therefore, the control circuit 14 may apply the search mode to each power supply circuit, with the power supply circuit having been operated in the power transmission mode being taken as the search reference point.

Further, if the signal indicating the power reception status included in the wireless signal received from the power reception device 3 indicates that power transmission is not required, the control circuit 14 returns each power supply circuit to the standby mode and stores, to the memory, identification information of the power supply circuit that has been used for power transmission. Afterwards, if the signal indicating the power reception status included in the wireless signal received from the power reception device 3 indicates that resumption of power transmission is required, the control circuit 14 may operate each power supply circuit in the search mode by taking, as the search reference point, the power supply circuit that has been used for power transmission immediately before and stored in the memory.

Furthermore, if the control circuit 14 becomes unable to receive the wireless signal from the power reception device 3, the control circuit 14 returns each power supply circuit to the standby mode and ends the power transmission to the power reception device 3.

As described above, the power transmission device includes a plurality of power transmission coils, and when a power reception device is arranged at a position capable of receiving power from the power transmission device, the power transmission device transmits power to the power reception device via any of the plurality of power transmission coils. At this time, the power transmission device receives a signal indicating a power reception status from the power reception device and, according to the power reception status, selects the power transmission coil with a highest power transmission efficiency from among the plurality of power transmission coils as the power transmission coil to be used for power transmission. Therefore, the power transmission device can increase the degree of freedom in the position of the power reception device during power transmission, and can improve the power transmission efficiency. Thus, for example, even if the position of the power reception device changes due to a need for moving an apparatus mounted with the power reception device for reasons such as renovation work in a building, the power reception device can still receive power from the power transmission device. In this manner, with the power transmission device, even if the position of the apparatus mounted with the power reception device changes, construction work for equipment for supplying power to this apparatus is not required.

According to a modification example, the substrate 15 provided with the plurality of power transmission coils 12-1 to 12-n may be supported by a support member capable of adjusting the position or inclination of the substrate 15. By controlling the support member to adjust the position or inclination of the substrate 15, the control circuit 14 can change the position or inclination of the power transmission coil used for power transmission to further improve the efficiency of power transmission to the power reception device 3.

Figure 6:
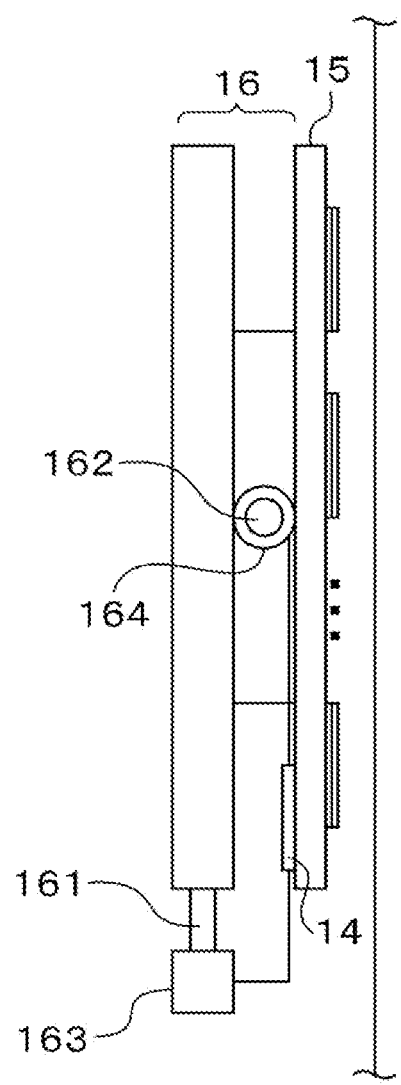
FIG. 6 is a view showing an example of an arrangement of the substrate provided with the parts of the power transmission device and a support member according to a modification example.

FIG. 6 is a view showing an example of an arrangement of the substrate 15 provided with the parts of the power transmission device 2 such as the plurality of power transmission coils and a support member according to this modification example. In this modification example, the substrate 15 provided with the parts of the power transmission device 2 is supported by a support member 16 configured as an XY stage. Actuators 163 and 164 respectively driving two shafts 161 and 162 of the support member 16 are connected to the control circuit 14.

In the search mode, the control circuit 14 selects the power transmission coil with the maximum measured value of the output voltage from the power reception device 3 and the power supply circuit that supplies AC power to this power transmission coil. The control circuit 14 supplies AC power to the corresponding power transmission coil only from the specified power supply circuit, and controls the actuators 163 and 164 of the respective shafts 161 and 162 of the support member 16 to change the position of the power transmission coil supplied with AC power by a predetermined distance in each of the up-down and left-right directions. Then, the control circuit 14 specifies a direction in which the measured value of the output voltage from the power reception device 3 increases, and changes the position of the power transmission coil supplied with AC power toward the specified direction to specify a position at which the measured value of the output voltage from the power reception device 3 is the highest. Then, the control circuit 14 stops the actuators 163 and 164 to fix at the specified position. Afterwards, the control circuit 14 may operate the specified power supply circuit in the power transmission mode in a manner similar to the above embodiment.

According to this modification example, since the power transmission device can optimize the position of the power transmission coil used for power transmission based on the positional relationship with the power reception device, the power transmission efficiency can be further improved.

In the case where the support member 16 is an inclination stage capable of changing the inclination of the substrate 15, when operating any power supply circuit in the search mode, the control circuit 14 may control the support member 16 to adjust the inclination of the substrate 15 so that the measured value of the output voltage from the power reception device 3 is the highest.

Further, the plurality of power transmission coils 12-1 to 12-n may be provided one by one or in pluralities on multiple different substrates. In this case, each substrate may be supported by a different support member. In this case, the control circuit 14 may control the position or inclination only for the support member provided with the power transmission coil supplied with AC power from the power supply circuit operated in the search mode.

According to another modification example, one or more power transmission coils to be used for power transmission among the plurality of power transmission coils 12-1 to 12-n may be set in advance via another apparatus. In this case, an apparatus such as a mobile terminal capable of communicating with the communicator 13 transmits a wireless signal including presetting information designating the power transmission coil to be used for power transmission. Referring to the presetting information included in the wireless signal received via the communicator 13, the control circuit 14 selects the power transmission coil to be used for power transmission and the power supply circuit supplying AC power to this power transmission coil. Until a wireless signal can be received from the power reception device 3, the control circuit 14 operates only the specified power supply circuit in the standby mode, and sets the other power supply circuits to the idle mode. Upon receiving a wireless signal from the power reception device 3, the control circuit 14 operates the selected power supply circuit in the power transmission mode.

Two or more power transmission coils may be designated in the presetting information. In this case, upon receiving a wireless signal from the power reception device 3, by operating only the power supply circuits corresponding to each of the designated power transmission coils in the search mode, the power transmission coil and the power supply circuit that are eventually used for power transmission can be specified.

According to this modification example, since the power transmission coil and the power supply circuit to be used for power transmission are specified in advance, the time until power can be transmitted to the power reception device is shortened. Furthermore, since the power transmission device can limit the power supply circuits to be operated in the standby mode, it is possible to reduce power consumption when power transmission is not performed.

According to yet another modification example, the power transmission device 2 may be configured so that AC power is supplied from one power supply circuit to two or more power transmission coils. In this case, a 1-input m-output switch (where m is an integer equal to or greater than 2) may be provided between the power supply circuit and the power transmission coils to which AC power is supplied from this power supply circuit. With the control circuit 14 controlling the switch, the power transmission coil to which AC power is supplied from the power supply circuit may be switched.

According to this modification example, since the quantity of power supply circuits can be smaller than the quantity of power transmission coils, the circuit scale of the power transmission device can be suppressed.

Thus, a person skilled in the art may make various modifications within the scope of the disclosure according to the embodiment.

What is claimed is:

1. A power transmission device capable of transmitting power to a power reception device comprising a power reception coil in a non-contact manner, the power transmission device comprising: a plurality of power transmission coils which transmit power to the power reception device via the power reception coil; at least one power supply circuit which supplies AC power to the plurality of power transmission coils, respectively; a communicator of the power transmission device which receives a signal indicating a power reception status of the power reception device from a communicator of the power reception device, wherein the power reception status of the power reception device is determined by comparing a measured value of an output voltage from the power reception circuit of the power reception device with a predetermined threshold at a predetermined cycle;

the signal indicating the power reception status indicating a predetermined allowable range to be satisfied by the output voltage, together with a latest measured value of the output voltage, wherein the predetermined allowable range is the range capable of receiving power from the power transmission coils; and a control circuit which selects, according to the power reception status, a power transmission coil with a highest efficiency of power transmission to the power reception device from among the plurality of power transmission coils to serve as the power transmission coil to be used for power transmission to the power reception device, and controls the at least one power supply circuit so that AC power is supplied to the selected power transmission coil among the plurality of power transmission coils and AC power is not supplied to an unselected power transmission coil among the plurality of power transmission coils, wherein the control circuit controls a power factor correction circuit of the power supply circuit to adjust the voltage of the AC power supplied from the power supply circuit to the corresponding power transmission coil according to the signal so that the measured value of the output voltage is within the predetermined allowable range, wherein when the transmitting coils are arranged two-dimensionally, the AC power is supplied in an order of raster scans.

2. The power transmission device according to claim 1, wherein the signal indicating the power reception status comprises a value indicating a voltage outputted from the power reception device, while the signal indicating the power reception status is not received from the power reception device, the control circuit supplies AC power to each of the plurality of power transmission coils from a corresponding power supply circuit among the at least one power supply circuit at a predetermined cycle and at mutually different timings, and in the plurality of power transmission coils, from among a power transmission coil that is supplied with AC power when the signal indicating the power reception status is received from the power reception device and at least one power transmission coil positioned around this power transmission coil, the control circuit selects a power transmission coil with a highest voltage outputted from the power reception device to serve as the power transmission coil to be used for power transmission to the power reception device, wherein when the transmitting coils are arranged two-dimensionally, the power supply circuits corresponding to each transmitting coil located in an odd-numbered row or an odd-numbered column are sequentially set to be active.

3. The power transmission device according to claim 1, wherein the plurality of power transmission coils are provided on a substrate, and the substrate is supported by a support member capable of adjusting a position of the substrate, and the control circuit controls, according to the power reception status, the support member to adjust the position of the substrate so that a power transmission efficiency in a case of transmitting power from the selected power transmission coil to the power reception device increases, wherein when the transmitting coils are arranged in a line along a specified straight line or curve, the power supply circuits may be set to be active one by one in a sequence from the power supply circuit corresponding to the power transmission coil positioned at either end to the power supply circuit corresponding to the power transmission coil positioned at the other end.

* * * * *